(12) United States Patent
Kamat et al.

(10) Patent No.: US 11,861,413 B2
(45) Date of Patent: Jan. 2, 2024

(54) EFFICIENT USE OF RESERVED RESOURCE INSTANCES IN CLUSTERS OF HOST COMPUTERS IN A CLOUD-BASED COMPUTING ENVIRONMENT

(71) Applicant: VMware, Inc., Palo Alto, CA (US)

(72) Inventors: Amita Vasudev Kamat, San Jose, CA (US); Piyush Hasmukh Parmar, Pune (IN); Aalap Desai, Newark, CA (US); Keith Istvan Farkas, San Carlos, CA (US)

(73) Assignee: VMWARE, INC., Palo Alto, CA (US)

( * ) Notice: Subject to any disclaimer, the term of this patent is extended or adjusted under 35 U.S.C. 154(b) by 31 days.

(21) Appl. No.: 17/542,258

(22) Filed: Dec. 3, 2021

(65) Prior Publication Data
US 2023/0176924 A1    Jun. 8, 2023

(51) Int. Cl.
*G06F 9/50*   (2006.01)
(52) U.S. Cl.
CPC ............ *G06F 9/5077* (2013.01); *G06F 9/505* (2013.01); *G06F 2209/503* (2013.01)
(58) Field of Classification Search
CPC ... G06F 9/5077; G06F 9/505; G06F 2209/503
See application file for complete search history.

(56) References Cited

U.S. PATENT DOCUMENTS

| 11,593,180 | B2* | 2/2023 | Gupta | H04L 67/1021 |
| 2021/0109789 | A1* | 4/2021 | McWeeney | G06F 9/5022 |
| 2021/0157644 | A1* | 5/2021 | Unnikrishnan | G06F 9/5072 |
| 2022/0318060 | A1* | 10/2022 | Choochotkaew | G06F 9/5005 |
| 2022/0353201 | A1* | 11/2022 | Navali | H04L 47/125 |

OTHER PUBLICATIONS

VMware, "Elastic DRS for VMware Cloud on AWS", https://blogs.vmware.com/cloud/2019/05/15/elastic-drs-vmware-cloud-aws/, May 15, 2019, 8 pgs.
VMware, "VMware Cloud on AWS", https://www.vmware.com/products/vmc-on-aws.html#pricing, retrieved Dec. 15, 2021, 4 pgs.
VMware, "VMware Cloud on AWS Operations Guide", SDDC Version 1.16; VMware Cloud on AWS, https://docs.vmware.com/en/VMware-Cloud-on-AWS/services/com.vmware.vmc-aws-operations/GUIDA0F15ABA-C2DF-46CD-B883-A9FABD892B75.html, Dec. 15, 2021, 139 pgs.

* cited by examiner

*Primary Examiner* — Michael A Keller
(74) *Attorney, Agent, or Firm* — LOZA & LOZA, LLP

(57) ABSTRACT

System and computer-implemented method for autoscaling clusters of host computers in a cloud-based computing environment uses an aggressive scale-in resource utilization threshold that is greater than a corresponding standard scale-in resource utilization threshold to search for any target clusters of host computers in response to a scale-out recommendation for a cluster of host computers to select a candidate cluster of host computers when the number of available reserved resource instance for the cloud-based computing environment is below a predefined value. A scale-in operation is executed on the candidate cluster of host computers to remove an existing resource instance from the candidate cluster of host computers. A scale-out operation is executed on the cluster of host computers using an available resource instance for the cloud-based computing environment.

20 Claims, 7 Drawing Sheets

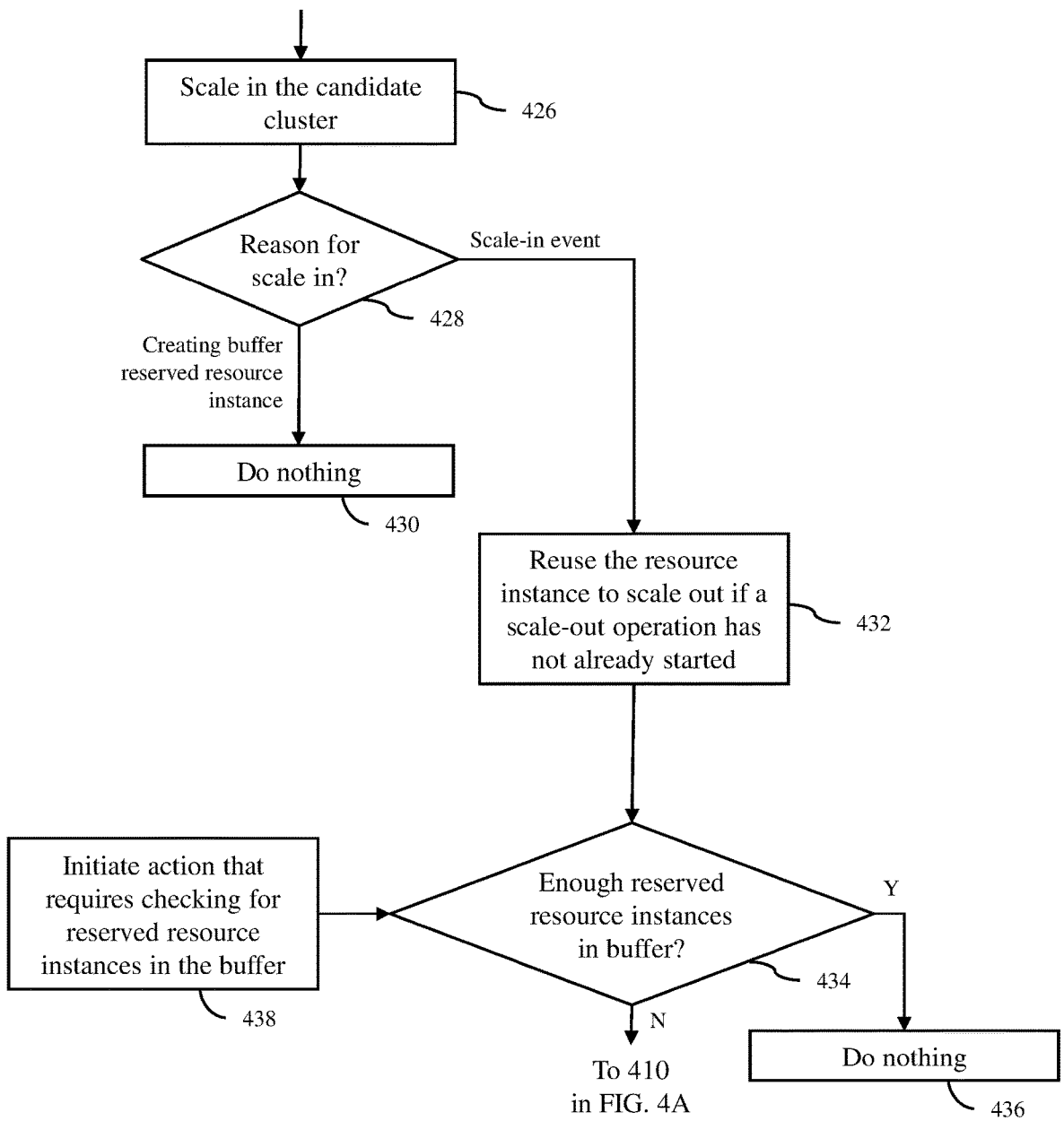

EFFICIENT USE OF RESERVED RESOURCE INSTANCES IN CLUSTERS OF HOST COMPUTERS IN A CLOUD-BASED COMPUTING ENVIRONMENT

BACKGROUND

Various computing architectures can be deployed in a public cloud as a cloud service. For example, one or more software-defined data centers (SDDCs) may be deployed for an entity or customer in a public cloud via a cloud service provider, where each SDDC may include one or more clusters of host computers. As part of the cloud service, an automatic scaling feature may be provided that monitors the storage, CPU and memory utilizations of all clusters for the entity and automatically scales appropriate clusters to provide optimal performance. As an example, when any resource utilization of a cluster exceeds a certain maximum threshold, a host computer can be added to the cluster. Similarly, when all resource utilizations of a cluster drop below certain minimum thresholds, an existing host computer can be removed from the cluster.

However, such an automatic scaling feature does not take into consideration costs associated with scaling out clusters. As an example, when all reserved host computers for a customer have been exhausted, on-demand host computers may be needed in order to scale out the clusters. However, on-demand host computers are typically more costly than reserved host computers, which are based on a subscription. Thus, there is a need for an automatic scaling solution that minimizes the use of on-demand host computers.

SUMMARY

System and computer-implemented method for autoscaling clusters of host computers in a cloud-based computing environment uses an aggressive scale-in resource utilization threshold that is greater than a corresponding standard scale-in resource utilization threshold to search for any target clusters of host computers in response to a scale-out recommendation for a cluster of host computers to select a candidate cluster of host computers when a number of available reserved resource instance for the cloud-based computing environment is below a predefined value. A scale-in operation is executed on the candidate cluster of host computers to remove an existing resource instance from the candidate cluster of host computers. A scale-out operation is executed on the cluster of host computers using an available resource instance for the cloud-based computing environment.

A computer-implemented method for autoscaling clusters of host computers in a cloud-based computing environment in accordance with an embodiment of the invention comprises generating a scale-out recommendation for a cluster of host computers in the cloud-based computing environment, checking the cloud-based computing environment for any available reserved resource instances in response to the scale-out recommendation, when a number of available reserved resource instance for the cloud-based computing environment is below a predefined value, searching the cloud-based computing environment for any target clusters of host computers to scale in based on at least one resource utilization using an aggressive scale-in resource utilization threshold that is greater than a corresponding standard scale-in resource utilization threshold, when at least one target cluster of host computer is found, executing a scale-in operation on a candidate cluster of host computers selected from the at least one target cluster of host computers to remove an existing resource instance from the candidate cluster of host computers, and executing a scale-out operation on the cluster of host computers using an available resource instance for the cloud-based computing environment. In some embodiments, the steps of this method are performed when program instructions contained in a computer-readable storage medium are executed by one or more processors.

A system in accordance with an embodiment of the invention comprises memory and one or more processors configured to generate a scale-out recommendation for a cluster of host computers in a cloud-based computing environment, check the cloud-based computing environment for any available reserved resource instances in response to the scale-out recommendation, when a number of available reserved resource instance for the cloud-based computing environment is below a predefined value, search the cloud-based computing environment for any target clusters of host computers to scale in based on at least one resource utilization using an aggressive scale-in resource utilization threshold that is greater than a corresponding standard scale-in resource utilization threshold, when at least one target cluster of host computer is found, execute a scale-in operation on a candidate cluster of host computers selected from the at least one target cluster of host computers to remove an existing resource instance from the candidate cluster of host computers, and execute a scale-out operation on the cluster of host computers using an available resource instance for the cloud-based computing environment.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
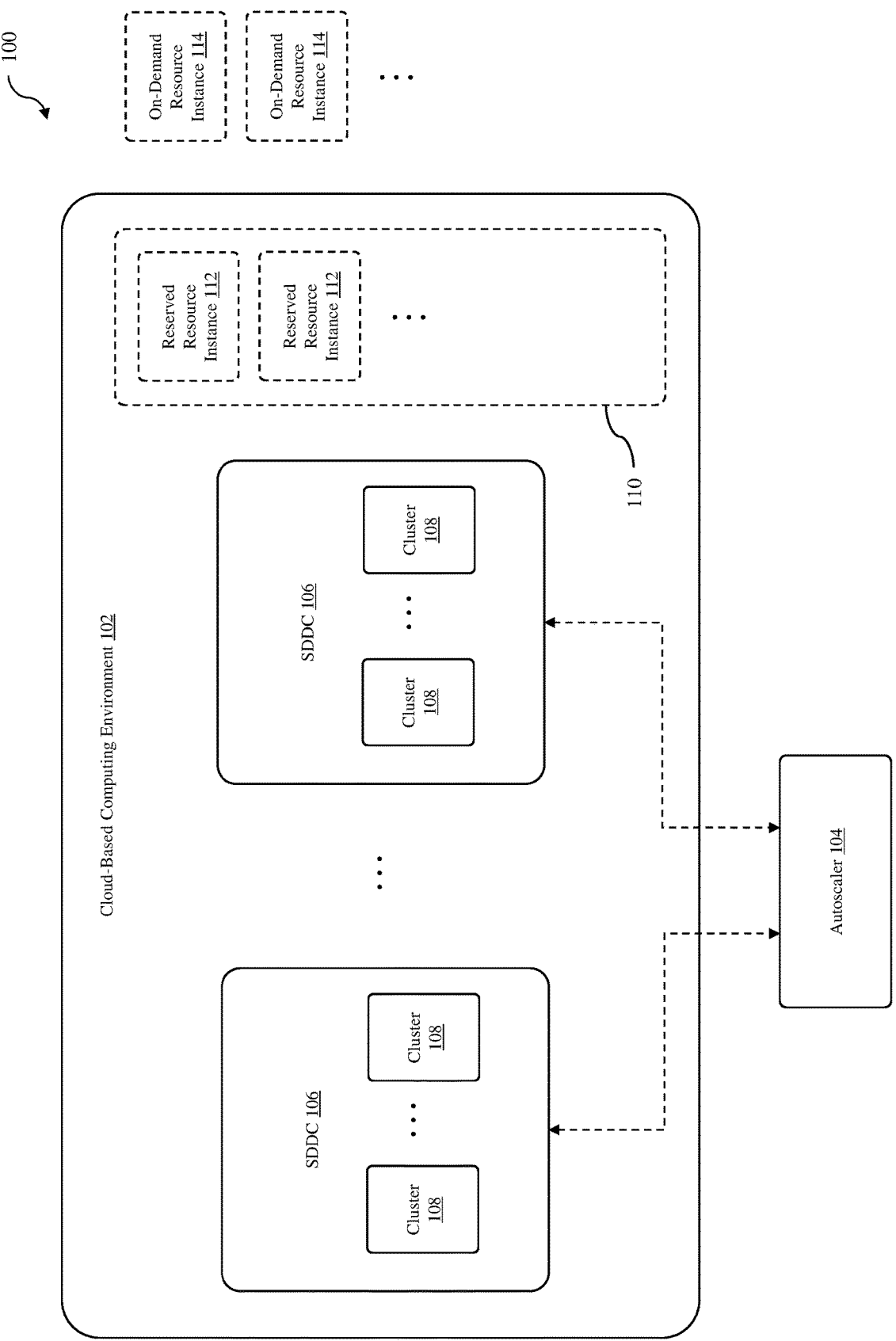
FIG. 1 is a block diagram of a cloud system in accordance with an embodiment of the invention.

Turning now to FIG. 1, a block diagram of a cloud system 100 in accordance with an embodiment of the invention is shown. The cloud system 100 may be a public cloud platform, which allows entities, such as organizations and enterprises, to use the platform to run their applications in separate cloud-based computing environments. For ease of description, the cloud system 100 is shown to include one cloud-based computing environment 102 and an autoscaler 104. In a particular implementation, the cloud-based computing environment 102 may be a VMware Cloud Organization of a VMware Cloud™ on AWS (VMC on AWS) and the autoscaler 104 may be a feature provided as part of the VMC on AWS.

As shown in FIG. 1, the cloud-based computing environment 102 includes one or more software-defined data centers (SDDCs) 106, which each includes one or more clusters 108 of host computers. In an embodiment, each SDDC 106 is a collection of bare-metal host computers, which may be installed with various software. In this embodiment, each SDDC 106 is running atop dedicated hardware, i.e., bare-metal host computers. The SDDCs 106 are described in more detail below.

The SDDCs 106 in the cloud-based computing environment 102 are supported by a pool 110 of reserved resource instances 112, which, in this embodiment, are host computers. These reserved resource instances 112 may be provisioned to the cloud-based computing environment 102 as needed in the various clusters 108 of host computers. Thus, the reserved resource instances 112 are not part of the cloud-based computing environment 102 until they are requested and provisioned to the cloud-based computing environment. The number of reserved resource instances 112 in the pool 110 that can be provisioned to the cloud-based computing environment 102 may be based on a subscription, which may define a period of time for the subscription and the cost per reserved resource instance, in addition to the number of reserved resource instances 112 contracted for the cloud-based computing environment. When the reserved resource instances 112 are exhausted for the cloud-based computing environment 102, i.e., there are no more reserved resource instances in the pool, on-demand resource instances 114, e.g., on-demand host computers, may be requested from the cloud system 100 and provisioned to the cloud-based computing environment 102. However, the on-demand resource instances 114 are typically more costly than the reserved resource instances 112. Thus, a cost-effective approach to maintaining the cloud-based computing environment 102 is to reduce the use of on-demand resource instances 114 whenever possible.

Figure 2:
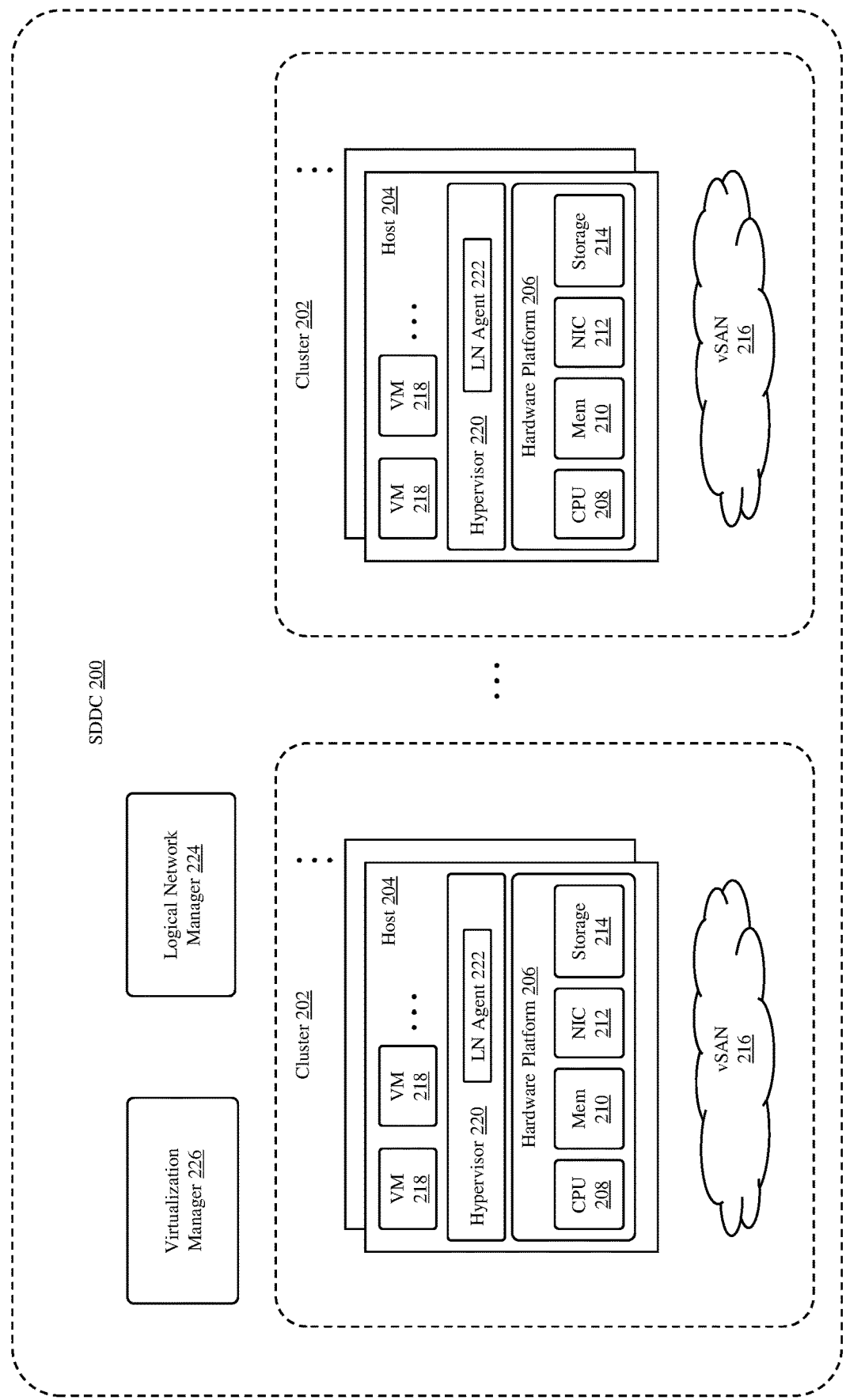
FIG. 2 is a diagram of a software-defined data center (SDDC) that can be deployed in a cloud-based computing environment in the cloud system shown in FIG. 1 in accordance with an embodiment of the invention.

Turning now to FIG. 2, an SDDC 200 that can be deployed in the cloud-based computing environment 102 in accordance with an embodiment of the invention is illustrated. As shown in FIG. 2, the SDDC 200 includes one or more clusters 202 of host computer systems ("hosts") 204. In an embodiment, each cluster 202 share resources, such as memory, central processing unit (CPU) and storage, and can be managed as a single entity. The hosts 204 in the clusters 202 may be constructed on a server grade hardware platform 206, such as an x86 architecture platform. As shown, the hardware platform 206 of each host 204 may include conventional components of a computing device, such as one or more processors (e.g., CPUs) 208, system memory 210, a network interface 212, and storage 214. The processor 208 can be any type of a processor commonly used in servers. The memory 210 is volatile memory used for retrieving programs and processing data. The memory 210 may include, for example, one or more random access memory (RAM) modules. The network interface 212 enables the host 204 to communicate with other devices that are inside or outside of the SDDC 200. The network interface 212 may be one or more network adapters, also referred to as a Network Interface Card (NIC). The storage 214 represents one or more local storage devices (e.g., one or more hard disks, flash memory modules, solid state disks and optical disks), which may be used together with storages from other hosts in the same cluster to form a virtual storage area network (vSAN) 216.

Each host 204 may be configured to provide a virtualization layer that abstracts processor, memory, storage and networking resources of the hardware platform 206 into the virtual computing instances, e.g., virtual machines 218, that run concurrently on the same host. The virtual machines 218 run on top of a software interface layer, which is referred to herein as a hypervisor 220, that enables sharing of the hardware resources of the host by the virtual machines. One example of the hypervisor 220 that may be used in an embodiment described herein is a VMware ESXi™ hypervisor provided as part of the VMware vSphere® solution made commercially available from VMware, Inc. The hypervisor 220 may run on top of the operating system of the host or directly on hardware components of the host. For other types of virtual computing instances, the host may include other virtualization software platforms to support those virtual computing instances, such as Docker virtualization platform to support "containers".

In the illustrated embodiment, the hypervisor 220 includes a logical network (LN) agent 222, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the SDDC 200. The logical network agent 222 receives configuration information from a logical network manager 224 (which may include a control plane cluster) and, based on this information, populates forwarding, firewall and/or other action tables for dropping or directing packets between the virtual machines 218 in the host 204 and other virtual computing instances on other hosts, as well between the virtual machines 218 in the host 204 and devices outside of the SDDC 200. Collectively, the logical network agent 222, together with other agents on other hosts, according to their forwarding/routing tables, implement isolated overlay networks that can connect arbitrarily selected virtual machines or other virtual computing instances with each other. Each virtual machine or virtual computing instance may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 222 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The SDDC 200 also includes a virtualization manager 226 that manages the clusters 202 of hosts 204. In an embodiment, the virtualization manager 226 is a computer program that resides and executes in a computer system, such as one of the hosts 204, or in a virtual computing instance, such as one of the virtual machines 218 running on the hosts 204. One example of the virtualization manager 226 is the VMware vCenter Server® product made available from VMware, Inc. The virtualization manager 226 is configured to carry out administrative tasks for the clusters of hosts in the SDDC 200, which may include monitoring resource utilizations (e.g., CPU, memory and storage utilizations) in the clusters, managing the hosts in the clusters, managing the virtual machines running on the hosts in the clusters, provisioning virtual machines, migrating virtual machines from one host to another host, and load balancing between the hosts in the clusters.

As noted above, the SDDC 200 also includes the logical network manager 224 (which may include a control plane cluster), which operates with the logical network agents 222 in the hosts 204 to manage and control logical overlay networks in the SDDC. Logical overlay networks comprise logical network devices and connections that are mapped to physical networking resources, e.g., switches and routers, in a manner analogous to the manner in which other physical resources as compute and storage are virtualized. In an embodiment, the logical network manager 224 has access to information regarding physical components and logical overlay network components in the SDDC 200. With the physical and logical overlay network information, the logical network manager 224 is able to map logical network configurations to the physical network components that convey, route, and filter physical traffic in the SDDC 200. In one particular implementation, the logical network manager 224 is a VMware NSX™ manager running on any computer, such as one of the hosts 204 or a virtual machine 218 in the SDDC 200.

Turning back to FIG. 1, the autoscaler 104 operates to automatically scale out and scale in the clusters 108 of hosts in the different SDDCs 106 to provide an elastic cluster feature for the cloud-based computing environment 102. A scale-out operation on a cluster is an operation to add resources to the cluster when one or more resource utilizations, e.g., CPU, memory and storage, exceeds scale-out resource utilization thresholds. In an embodiment, a cluster is scaled out when any of the resource utilizations consistently remain above the scale-out resource utilization thresholds. A scale-in operation on a cluster is an operation to remove or release resources from the cluster when one or more resource utilizations, e.g., CPU, memory and storage, fall below scale-in resource utilization thresholds. In an embodiment, a cluster is scaled in when all the resource utilizations are consistently below the scale-in resource utilization thresholds. In an embodiment, the resources that are being removed for scale-in operations and added for scale-out operations are host computers. However, in other embodiments, these resources may be other type of physical resources, such as storage devices, or virtual resources, such as virtual compute, memory and/or storage resources. In an embodiment, the autoscaler is implemented as software running in the cloud system 100.

In addition, the autoscaler 104 provide an enhanced elastic cluster feature, which makes the best use of the reserved resource instances 112, e.g., reserved host computers, and reduces the use of on-demand resource instances 114, e.g., on-demand host computers. Specifically, whenever one or more resource utilizations of a particular cluster in the cloud-based computing environment 102 exceeds the corresponding scale-out resource utilization thresholds and the reserved resource instances 112 for the cloud-based computing environment 102 have been exhausted, the autoscaler 104 checks the resource utilizations of all the clusters in the SDDCs 106 of the cloud-based computing environment before adding one of the on-demand resource instance 114. Using aggressive scale-in resource utilization thresholds, which are higher than the standard scale-in resource utilization thresholds, the autoscaler 104 then performs a scale-in operation on any other cluster in the cloud-based computing environment 102 whose resource utilizations are below the aggressive scale-in resource utilization thresholds to make a reserved resource instance 112 available for scale-out use in order to avoid using on-demand resources, e.g., adding a new on-demand resource instance 114.

In an embodiment, the autoscaler 104 performs an aggressive scale-in operation on a cluster only if all the utilization values (e.g., storage, CPU and memory) are below the aggressive scale-in resource utilization thresholds. This makes sure that the clusters are not overcommitted and that there is no performance degradation. The aggressive scale-in thresholds can be slightly higher than the scale-in resource utilization thresholds, which automatically trigger a scale-in operation under normal scaling conditions, i.e., when reserved resource instances are available. Examples of standard scale-in resource utilization thresholds and aggressive scale-in resource utilization thresholds are illustrated in the following table.

| Resource | Standard Scale-in Resource Utilization Threshold | Aggressive Scale-in Resource Utilization Threshold |
|---|---|---|
| Storage | 20% | 35% |
| CPU | 60% | 65% |
| Memory | 60% | 65% |

In an embodiment, the autoscaler 104 may create a buffer of reserved resource instances 112 when the reserved resource instances for the cloud-based computing environment 102 have been exhausted. This means, when a scale-out recommendation is generated for a cluster in the cloud-based computing environment, the autoscaler checks the number of available reserved resource instances. If there is only one reserved resource instance capacity, the autoscaler proceeds with using the last reserved resource instance for a scale-out operation. In parallel, the autoscaler will scan the other clusters in the cloud-based computing environment to check if one or more aggressive scale-in operations can be performed to release more reserved resource instances into a pool of resource instances based on the buffer number, i.e., the desired number of reserved resources instances that are available for future use, which can be a predefined value set by a user. This way, when the next scale-out recommendation comes in, there will already be at least one reserved resource instance available in the pool, thus reducing the time for the scale-out operation. In addition, this approach reduces the dependency of a scale-out operation of one cluster on a scale-in operation of another cluster.

In an embodiment, when all the reserved resource instances 112 have run out for the cloud-based computing environment 102, for the clusters falling in the aggressive scale-in resource utilization thresholds, the autoscaler 104 can give priority to a cluster that already has an on-demand resource instance 114, e.g., an on-demand host computer. In this way, if possible, the on-demand resource instance is reused in the cluster that needs to be scaled out and provisioning a new additional on-demand resource instance is avoided.

In an embodiment where the resource instances are host computers, if the cluster to be scaled out and the cluster with the lowest resource utilization (i.e., the cluster to be scaled in) are in the same SDDC 106 of the cloud-based computing environment 102, the autoscaler 104 will just move a host computer from one cluster to the other since all the host computers in the SDDC will be at the same version. This will save the time required in releasing an instance, i.e., an existing host computer in the cluster to be scaled in, and provisioning a new cloud instance, a new host computer, for the cluster to be scaled out. This approach will especially be useful to reduce the recovery time objective (RTO) when the workloads spike during disaster recovery, which causes scale-out operations.

There are two major advantages of the enhanced elastic cluster feature provided by the autoscaler 104. The first major advantage is the cost effectiveness of the feature. By making effective use of the reserved resource instances 112, the use of on-demand resources is avoided unless it is absolutely necessary. This helps to save on the extra cost required for on-demand resources.

The second major advantage is the time efficiency of the feature. Consider a situation where there is a cluster with four (4) host computers and 60 Terabyte (TB) storage capacity and the aggressive scale-in resource utilization threshold for storage is set to 35%. The storage utilization of the cluster is 35%. So, there is approximately 5 TB (35% of 15 TB) of data on each host computer. Evacuating 1 TB of data takes maximum of 30 minutes. Thus, evacuating 5 TB of data will take maximum of 150 minutes or two and a half hours. Based on these calculations, releasing a host computer can take up to 160 minutes and provisioning a new host computer can take 20 minutes. So, the total time required to perform a scale-in operation first and then a scale-out operation can be around 180 minutes.

If both the clusters (the cluster to be scaled out and the cluster to be scaled in) are in different SDDCs 106 of the cloud-based computing environment 102, the autoscaler 104 can go ahead with removing the host computer from one SDDC and provisioning a new one in the other SDDC. However, if both the clusters are in the same SDDC, depending upon the use case, there are two options. The first option is to reuse the host computer without the overhead of cleaning up or re-imaging the host computer and just move the host computer from the low utilization cluster (the cluster to be scaled in) to the high utilization cluster (the cluster to be scaled out). This will save approximately 25 minutes since the autoscaler does not have to remove or provision a new host computer in the cloud-based computing environment. The second option is to just remove the host computer and provision a new host computer in the cloud-based computing environment if the host computer needs to be cleaned up and re-imaged before reusing it. This is because the cleaning up and re-imaging a host computer can increase the time to reuse the host computer by around 30 minutes. Thus, in this case, removing the host computer and provisioning a new host computer in the cloud-based computing environment would be more time efficient.

Figure 3A:
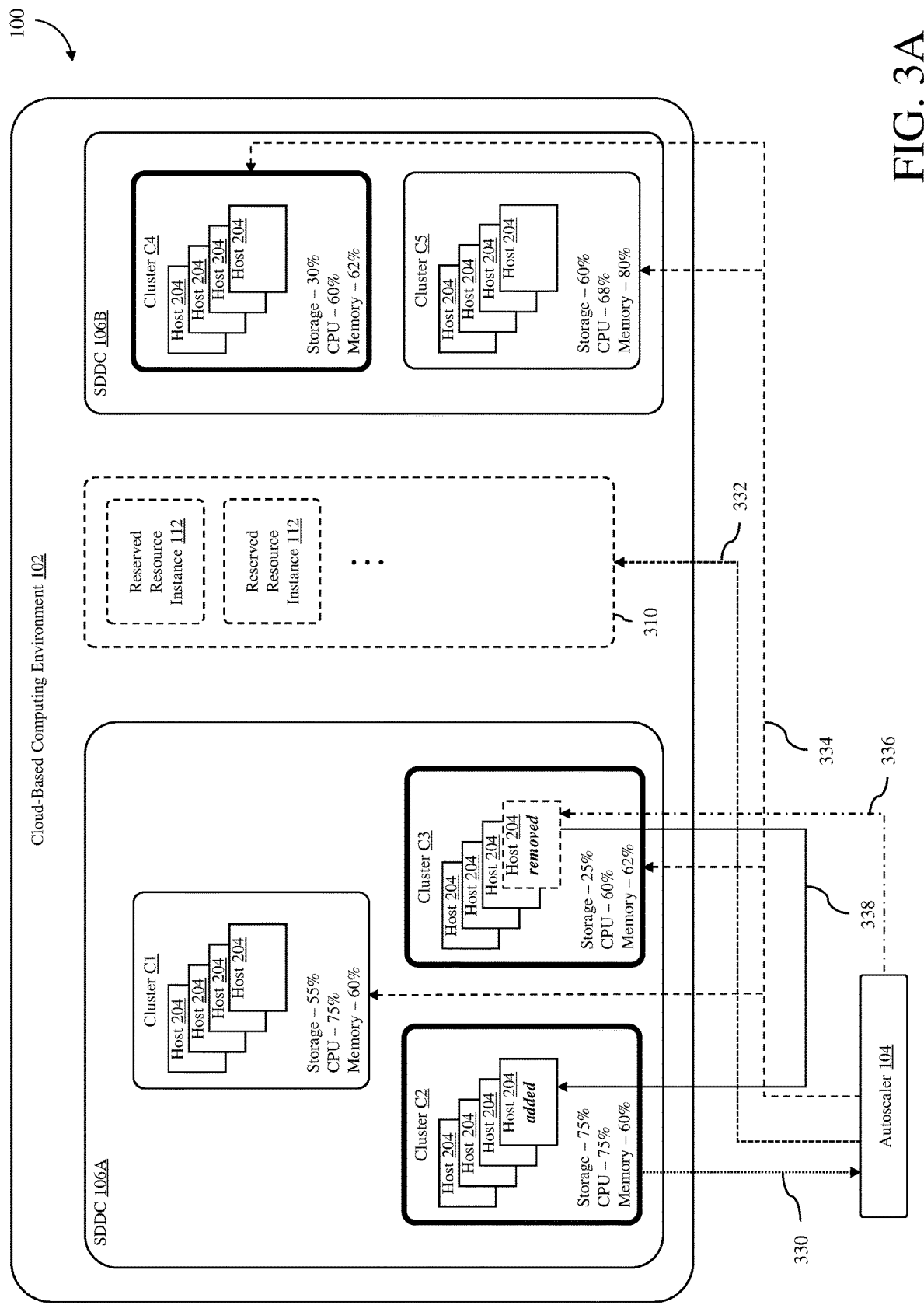
FIG. 3A illustrates an autoscaling operation executed by an autoscaler when both the cluster to be scaled out and the cluster to be scaled in are in the same SDDC in the cloud-based computing environment in accordance with an embodiment of the invention.

FIG. 3A illustrates the autoscaling operation executed by the autoscaler 104 when both the cluster to be scaled out and the cluster to be scaled in are in the same SDDC in the cloud-based computing environment 102 in accordance with an embodiment of the invention. As shown in FIG. 3A for this example, the cloud-based computing environment includes two SDDCs 106A and 106B. The SDDC 106A includes three clusters C1-C3 of host computers. Resource utilizations for the clusters C1-C3 are shown in the following table:

| Resource | Cluster C1 | Cluster C2 | Cluster C2 |
|---|---|---|---|
| Storage | 55% | 75% | 25% |
| CPU | 75% | 75% | 60% |
| Memory | 60% | 60% | 62% |

As shown in FIG. 3A, the SDDC 106B includes two clusters C4-C5 of host computers. Resource utilizations for the clusters C4-C5 are shown in the following table:

| Resource | Cluster C4 | Cluster C5 |
|---|---|---|
| Storage | 30% | 60% |
| CPU | 60% | 68% |
| Memory | 62% | 80% |

Also shown in FIG. 3A is a pool 310 of unused or available reserved resource instances 112, e.g., available reserved host computers, for the cloud-based computing environment 102. The reserved resource instances in the pool are all the available reserved resource instances that are currently not being used in any of the clusters in the cloud-based computing environment.

In this illustrated example, high resource utilizations in the cluster C2 generates a scale-out recommendation by the autoscaler 104 using the scale-out resource utilization thresholds, as indicated by the arrow 330. In an embodiment, the autoscaler may initiate an autoscaling operation based on a predefined schedule, e.g., every 5 minutes. As part of the autoscaling operation, requests for current resource utilizations of all the clusters in the cloud-based computing environment 102 are made by the autoscaler, which may be processed by virtualization managers (not shown) in the SDDCs 106A and 106B. The received resource utilization values for the clusters are then compared to the scale-out resource utilization thresholds to make scale-out recommendations for clusters with high resource utilizations, which in the illustrated example, resulted in a scale-out recommendation for the cluster C2.

In response to the scale-out recommendation for the cluster C2, the autoscaler 104 checks the pool 310 to see if any reserved resource instances 112 are available, as indicated by the arrow 332. If one or more unused reserved resource instances are available, the autoscaler will execute a scale-out operation on the cluster C2, which will involve adding one unused reserved resource instance to the cluster C2. However, if unused reserved resource instances are exhausted, the autoscaler checks resource utilization of all the clusters in the cloud-based computing environment 102 using the aggressive scale-in resource utilization thresholds, as indicated by the arrow 334, to find clusters that can be scaled in.

In this example, the clusters that can be scaled in using the aggressive scale-in resource utilization thresholds are the clusters C3 and C4, and the cluster with the lowest resource utilizations is the cluster C3, which happens to be in the same SDDC 106A as the cluster to be scaled out, i.e., the cluster C2. Thus, in this case, the autoscaler 104 will remove a host computer 204 from the cluster C3 (the cluster being scaled in), as indicated by the arrow 336. The removed host computer is then added to the cluster C2 (the cluster being scaled out), as indicated by the arrow 338. Thus, in this example, a host computer is moved from the cluster C3 (the cluster being scaled in) to the cluster C2 (the cluster being scaled out). In some embodiments, the selection of the host computer to be removed from the cluster C4 may be made by the autoscaler 104 or the virtualization manager (not shown) in the SDDC 106A.

Figure 3B:
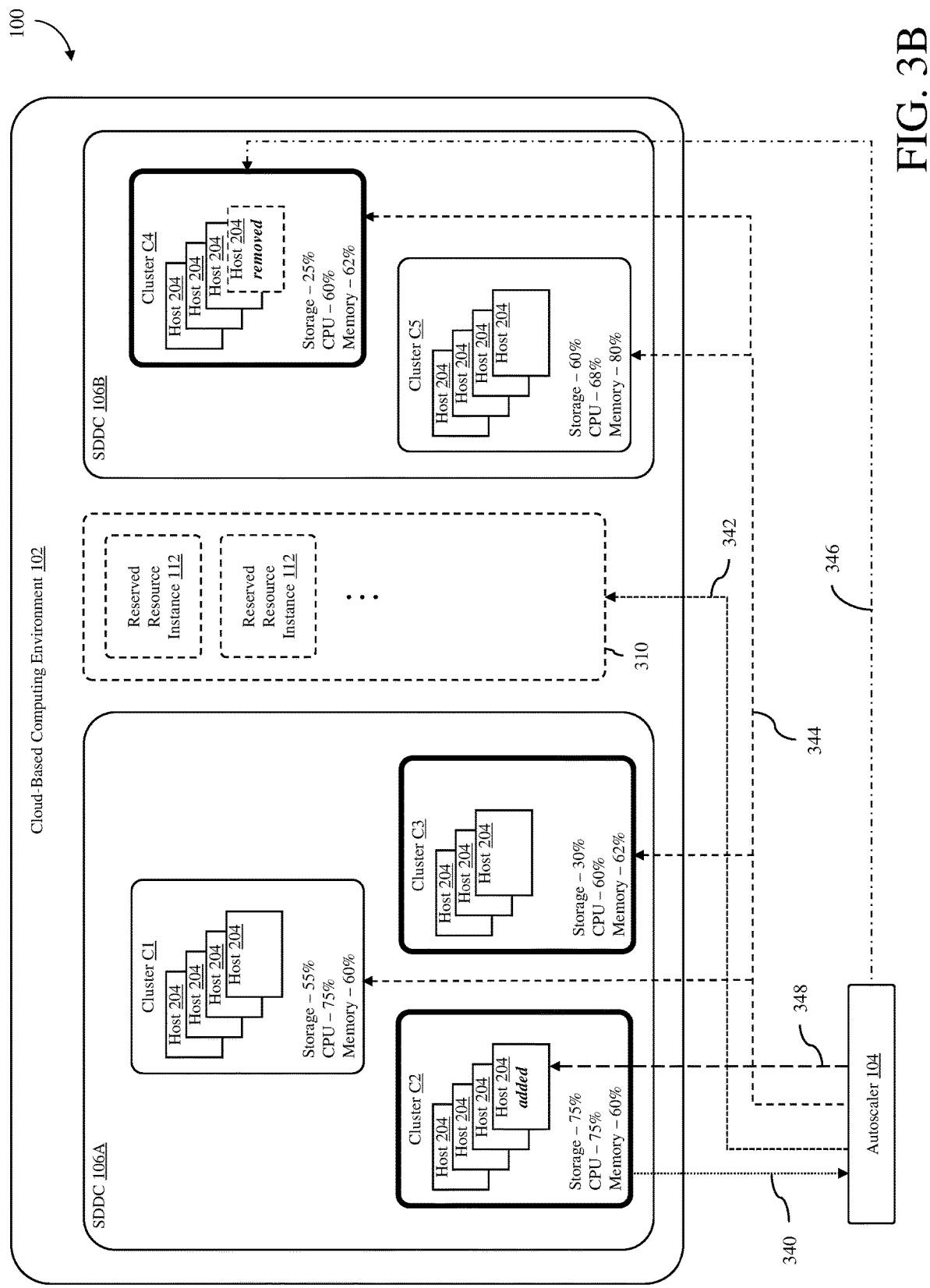
FIG. 3B illustrates an autoscaling operation executed by the autoscaler when the cluster to be scaled out and the cluster to be scaled in are in different SDDCs in the cloud-based computing environment in accordance with an embodiment of the invention.

FIG. 3B illustrates the autoscaling operation executed by the autoscaler 104 when the cluster to be scaled out and the cluster to be scaled in are in different SDDCs in the cloud-based computing environment 102 in accordance with an embodiment of the invention. As shown in FIG. 3B, the cloud-based computing environment again includes the two SDDCs 106A and 106B and the pool 310 of unused or available reserved resource instances 112, which were described above. In this example, the resource utilizations for the clusters C1-C3 are shown in the following table:

| Resource | Cluster C1 | Cluster C2 | Cluster C2 |
|---|---|---|---|
| Storage | 55% | 75% | 30% |
| CPU | 75% | 75% | 60% |
| Memory | 60% | 60% | 62% |

The resource utilization for the clusters C4-C5 are shown in the following table:

| Resource | Cluster C4 | Cluster C5 |
|---|---|---|
| Storage | 25% | 60% |
| CPU | 60% | 68% |
| Memory | 62% | 80% |

In this illustrated example, similar to the example shown in FIG. 3A, high resource utilizations in the cluster C2 generates a scale-out recommendation by the autoscaler 104 using the scale-out resource utilization thresholds, as indicated by the arrow 340. In response, the autoscaler again checks the pool 310 to see if any unused reserved resource instances 112 are available, as indicated by the arrow 342. If one or more unused reserved resource instances are available, the autoscaler will execute a scale-out operation on the cluster C2, which will involve adding one unused reserved resource instance to the cluster C2. However, if unused reserved resource instances are exhausted, the autoscaler checks resource utilizations of all the clusters in the cloud-based computing environment 102 using the aggressive scale-in resource utilization thresholds, as indicated by the arrow 344, to find clusters that can be scaled in.

In this example, the clusters that can be scaled in using the aggressive scale-in resource utilization thresholds are the clusters C3 and C4, and the cluster with the lowest resource utilizations is the cluster C4, which happens to be in a different SDDC, i.e., the SDDC 106B, as the cluster to be scaled-out, i.e., the cluster C2. Thus, in this case, the autoscaler 104 will remove and release a host computer 204 from the cluster C3 (the cluster being scaled in), as indicated by the arrow 346, which results in one reserved resource instance being available in the cloud-based computing environment 102. Next, a new host computer, i.e., the now-available reserved resource instance, is added to the cluster C2 (the cluster being scaled out), as indicated by the arrow 348. Thus, in this example, a host computer is released from the cluster C4 (the cluster being scaled in) and a new host computer is provisioned to the cluster C2 (the cluster being scaled out). In some embodiments, the selection of the host computer to be removed from the cluster C4 may be made by the autoscaler 104 or the virtualization manager (not shown) in the SDDC 106B.

In an embodiment, the autoscaler 104 may use various parameters to select which target cluster in the cloud-based computing environment 102 can be scaled in to accommodate the scale-out of a cluster of host computers in the cloud-based computing environment with high resource utilizations. These parameters may be set or modified by an administrator of the cloud-based computing environment so that the enhanced elastic cluster feature can be customized as needed. Some of these parameters are as follows:

Aggressive Scale-In Resource Utilization Thresholds

These thresholds are used when reserved resource instances 112 are needed in the cloud-based computing environment 102. As described above, these thresholds may include thresholds for storage, CPU and memory, which may be customized by an administrator of the cloud-based computing environment. The use of these thresholds is further explained below using examples.

Consider a scale-out scenario in the cloud-based computing environment 102 where the reserved resource instances 112 have been exhausted. The storage utilization of a first cluster in the cloud-based computing environment has exceeded 70% (exceeding the scale-out utilization threshold for storage) and a second cluster in the cloud-based computing environment has storage utilization of 28%. Let's assume that the standard scale-in resource utilization threshold for storage is 20%, which means that a cluster is scaled in, i.e., a host computer is removed, when the storage utilization goes below 20%. Let's further assume that the aggressive scale-in resource utilization threshold for storage is set to 35%. In this scale-out scenario, the autoscaler 104 will check the resource utilizations of other clusters in all the SDDCs in the cloud-based computing environment. The storage utilization of the second cluster (28%) is more than the standard scale-in threshold (20%) but less than the aggressive scale-in threshold (35%). Thus, in this case, the autoscaler can remove a host computer from the second cluster and reuse this instance or use a new available instance to scale out the first cluster.

As mentioned above, there can be similar aggressive scale-in resource utilization thresholds for memory as well as CPU. This will make the enhanced elastic cluster feature of the autoscaler 104 more cost efficient with optimal use of resources. Among these three resources, storage may be a hard resource constraint and may have a higher priority over CPU and memory when determining the cluster to be scaled in. In order to make these parameter more flexible, default aggressive scale-in resource utilization thresholds may be set for every SDDC 106 in the cloud-based computing environment 102 and an administrator can customize the aggressive scale-in resource utilization thresholds for every cluster in each SDDC based on the workloads running on the clusters.

Cluster Priority

This parameter allows an administrator of the cloud-based computing environment 102 to set priority to the clusters based on the workloads running on the clusters. For example, for clusters with test workloads, the priority for these clusters can be set "LOW", and for cluster with production workloads, the priority for the clusters can be set "HIGH". With these settings, during a scale-in operation, the autoscaler 104 will select one of the "LOW" priority clusters first so as to avoid affecting the "HIGH" priority clusters with higher priority workloads, e.g., production workloads. In an embodiment, the options for this parameter may be "LOW", "MEDIUM" and "HIGH", where "LOW" priority clusters will be selected for scale in over "MEDIUM" priority clusters, and "MEDIUM" priority clusters will be selected for scale in over "HIGH" priority clusters.

Data Utilization

This parameter allows an administrator of the cloud-based computing environment 102 to set the autoscaler 104 to take into consideration the data present on the host computers in order to remove or move host computers from one cluster to another cluster in the cloud-based computing environment 102 as quick as possible. With this parameter enabled, the autoscaler will pick the "cheapest" host computer to move/remove based on the amount of vSAN data on the host computer, which will reduce the time required to transfer the data for the move/removal.

Cost Vs Time

This parameter allows an administrator of the cloud-based computing environment 102 to have the flexibility to select between a time based priority or a cost based priority for certain applicable autoscaling situations. For example, consider a situation where there are no buffer or available reserved resource instances and a scale-out event is generated for one of the clusters. If none of the other clusters fit the aggressive scale-in criteria, the autoscaler 104 would go ahead and add an on-demand resource instance. However, if the autoscaler finds a cluster which can be scaled in, this parameter allows the user the flexibility to decide whether the user prefers cost (the scale out will wait until a host computer is made available by the scale in) or time (the scale out will go ahead and add an on demand host and the scale in will simultaneously release a reserved instance for future scale out).

Existing On-Demand Resource Instance

The effects of this parameter when enabled are illustrated using two cases. In the first case, a scale-out recommendation for a first cluster in the cloud-based computing environment 102 is generated by the autoscaler 104, but all the other clusters have resource utilizations higher than the aggressive scale-in resource utilization thresholds and there are no unused reserved instances available. In this case, the autoscaler will provision an on-demand resource instance in the first cluster. When the next scale-out recommendation for a second cluster in the cloud-based computing environment is generated, if the resource utilization values of the first cluster meets the aggressive scale-in resource utilization thresholds, the autoscaler will reuse the on-demand resource instance from the first cluster in the second cluster.

In the second case, a scale-out recommendation for the first cluster is generated by the autoscaler 104, but there is one available reserved resource instance and there is another cluster with an on-demand resource instance that meets the aggressive scale-in criteria. In this case, the autoscaler will go ahead with the scale-out of the first cluster using the available reserved resource instance and simultaneously release the on-demand resource instance from the other cluster to be more cost effective.

SDDC Priority

This parameter allows an administrator of the cloud-based computing environment 102 to set the autoscaler to prefer host computers being moved from one cluster to another cluster within the same SDDC rather than across different SDDCs. For example, if there are two clusters in different SDDCs that meet all the aggressive scale-in criteria, the autoscaler will pick the cluster based on the SDDC to which the cluster to be scaled out belongs. In other words, for scale in, priority will be given to the cluster which belongs to the same SDDC as the cluster which will be scaled out. This makes moving the host computer from one cluster to another cluster faster since moving a host computer within the SDDC is faster than moving a host computer from one SDDC to another SDDC.

Figures 4A, 4B:
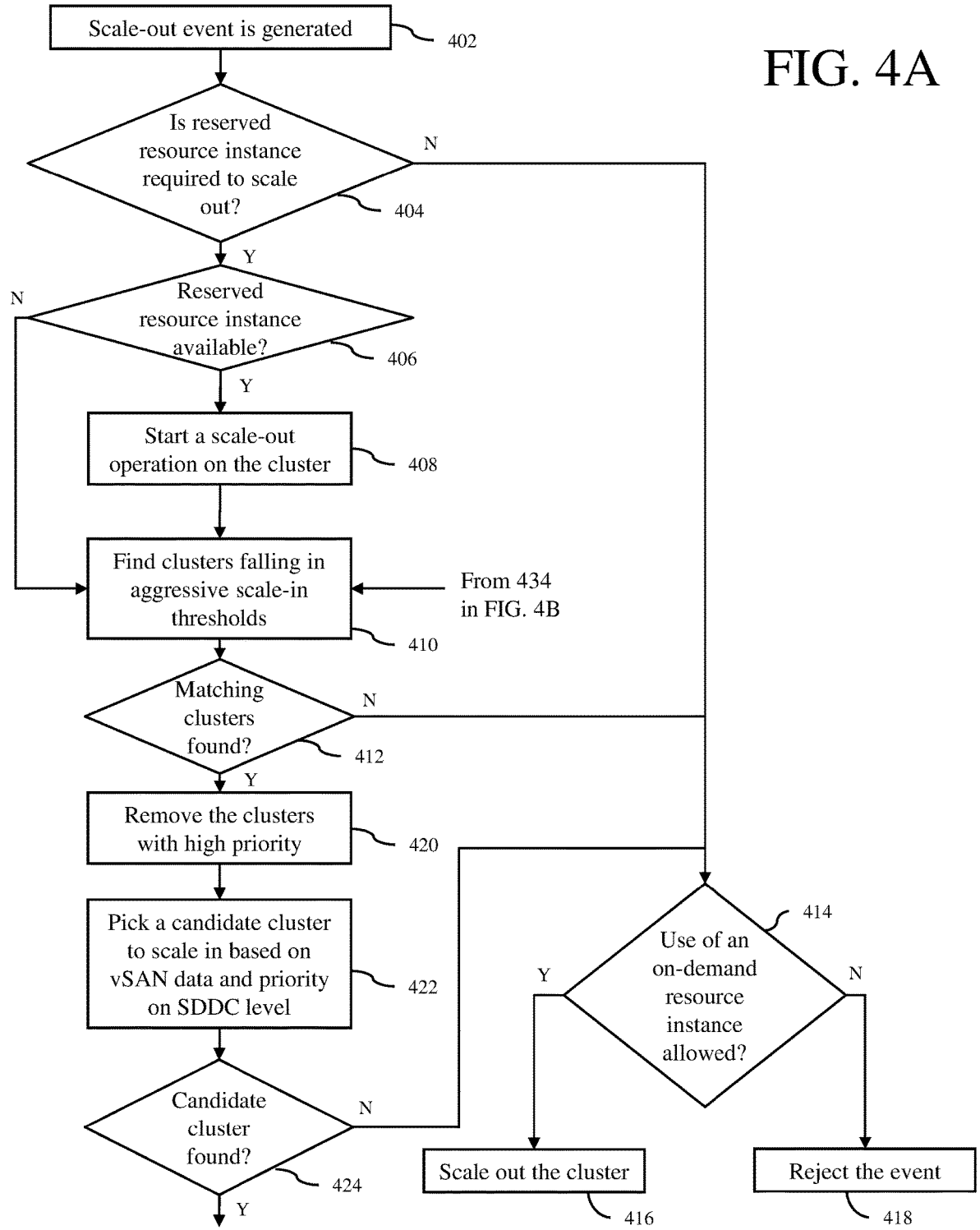
FIGS. 4A and 4B show a process flow diagram of an autoscaling operation on the cloud-based computing environment performed by the autoscaler in accordance with an embodiment of the invention.

An autoscaling operation on the cloud-based computing environment 102 performed by the autoscaler 104 in accordance with an embodiment of the invention is described with reference to a process flow diagram shown in FIGS. 4A and 4B. The autoscaling operation begins at step 402, where a scale-out event is generated for a particular cluster in the cloud-based computing environment by the autoscaler. In an embodiment, a scale-out event is a scale-out recommendation that is generated for a cluster when the autoscaler determines that one or more resource utilizations of the cluster exceed scale-out resource utilization thresholds. The values for the resource utilizations may be received from the virtualization manager of the SDDC to which the cluster belongs.

Next, at step 404, a determination is made by the autoscaler 104 whether a reserved resource instance is required to scale out. This requirement may be a user-set policy. If a reserved resource instance is not required, then the operation proceeds to step 414. However, if a reserved resource instance is required, then the operation proceeds to step 406, where a determination is made by the autoscaler 104 whether there is a reserved resource instance available for the cloud-based computing environment 102. If a reserved resource instance is not available, the operation proceeds to step 410. However, if a reserved resource instance is available, the operation proceeds to step 408, where a scale-out operation is started on the cluster to be scaled out. The operation then proceeds to step 410.

At step 410, other clusters in the cloud-based computing environment 102 are examined by the autoscaler 104 to find clusters falling in the aggressive scale-in resource utilization thresholds. In an embodiment, the clusters falling in the aggressive scale-in resource utilization thresholds are clusters with resource utilization values for storage, CPU and memory that are all below the corresponding aggressive scale-in resource utilization thresholds. Next, at step 412, a determination is made whether any matching clusters, i.e., any clusters falling in the aggressive scale-in resource utilization thresholds, are found. If no matching clusters are found, the operation proceeds to step 414. However, if matching clusters are found, the operation proceeds to step 420.

At step 414, a determination is made by the autoscaler 104 whether an on-demand resource instance is allowed to be used to scale out the cluster. This requirement may be a user-set policy. If the use of an on-demand resource instance is allowed, the operation proceeds to step 416, where the cluster is scaled out using an on-demand resource instance. The operation then comes to an end. However, if the use of an on-demand resource instance is not allowed, the operation proceeds to step 418, where the event is rejected and the operation then comes to an end. It is noted here that a scale-out operation on the same cluster will likely be retried during the next cycle, e.g., in 5 minutes, with the assumption that another scale-out event will be generated for the same cluster.

At optional step 420 (after one or more matching clusters have been found), any matching clusters with "HIGH" priority are removed from a list of matching clusters. In other embodiments, both "HIGH" and "MEDIUM" priority clusters may be removed so that only "LOW" priority clusters are considered. Next, at step 422, a candidate cluster to scale in is selected by the autoscaler 104 based on vSAN data and priority on SDDC level. In other embodiments, the selection of the candidate cluster may be based solely on resource utilizations, e.g., lowest among the matching clusters, or based on vSAN data or priority on SDDC level, which are user-selected parameters. Next, at step 424, a determination is made whether a candidate cluster has been found. If no candidate cluster has been found, then the operation proceeds to step 414. However, if a candidate cluster has been found, then the operation proceeds to step 426, where the candidate cluster is scaled in, which results in a resource instance, e.g., a host computer, being removed or released from the candidate cluster.

Next, step 428, a determination is made by the autoscaler 104 whether the reason for the scale in is for a scale-out event or creating a buffer reserved resource instance, i.e., a reserved resource instance available for future use. If the reason for the scale in is creating a buffer reserved resource instance, the operation proceeds to step 430, where no further action is taken by the autoscaler. The operation then comes to an end. However, if the reason for the scale in is for a scale-out event, the operation proceeds to step 432, where the reserved/on-demand resource instance released from the candidate cluster is reused to scale out if a scale-out operation has not already started. The operation then proceeds to step 434.

At step 434, a determination is made by the autoscaler 104 whether enough reserved resources instances are in the buffer, i.e., the pool of available reserved resource instances. If there is not enough reserved resource instances in the buffer, then the operation proceeds back to step 410 to try to make a reserved resource available by scaling in a candidate cluster using the aggressive scale-in resource utilization thresholds. However, if there is enough reserved instances in the buffer, the operation proceeds to step 436, where no further action is taken by the autoscaler. The operation then comes to an end.

In some embodiments, the autoscaler 104 may initiate actions that require checking for reserved resource instances in the buffer, at step 438. As an example, in an embodiment, a buffer check may be repeatedly initiated to determine whether sufficient reserved instances are in the buffer. As another example, in an embodiment, a demand prediction across workloads running in the cloud-based computing environment 102 may be initiated, which requires checking to ensure that there are sufficient reserved resource instances in the buffer for the predicted demand when needed. In these embodiments, the operation proceeds to step 434 to determine whether enough reserved resources instances are in the buffer so that one or more additional reserved resource instances can be added to the buffer using the aggressive scale-in resource utilization thresholds, as described above.

Figure 5:
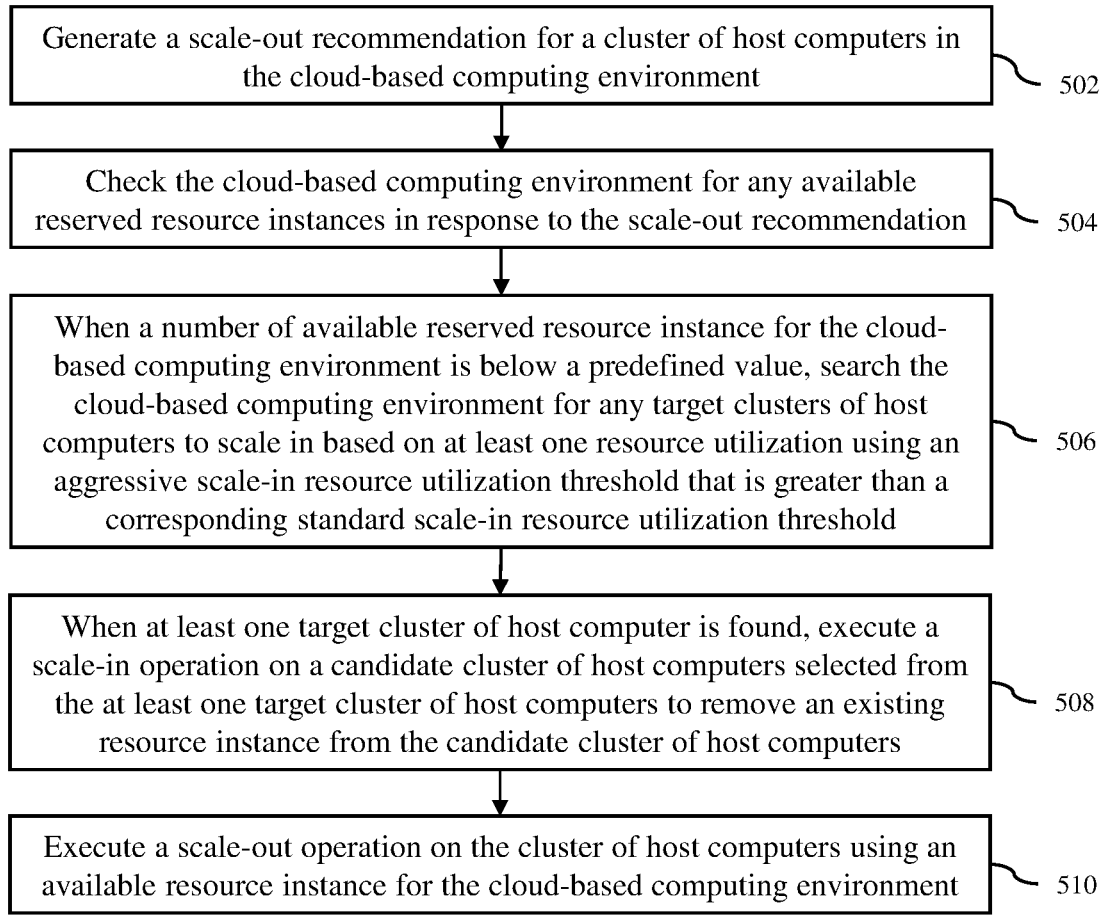
FIG. 5 is a process flow diagram of a computer-implemented method for autoscaling clusters of host computers in a cloud-based computing environment in accordance with an embodiment of the invention.

A computer-implemented method for autoscaling clusters of host computers in a cloud-based computing environment in accordance with an embodiment of the invention is described with reference to a process flow diagram of FIG. 5. At block 502, a scale-out recommendation is generated for a cluster of host computers in the cloud-based computing environment. At block 504, the cloud-based computing environment is checked for any available reserved resource instances in response to the scale-out recommendation. At block 506, when a number of available reserved resource instance for the cloud-based computing environment is below a predefined value, the cloud-based computing environment is searched for any target clusters of host computers to scale in based on at least one resource utilization using an aggressive scale-in resource utilization threshold that is greater than a corresponding standard scale-in resource utilization threshold. At block 508, when at least one target cluster of host computer is found, a scale-in operation is executed on a candidate cluster of host computers selected from the at least one target cluster of host computers to remove an existing resource instance from the candidate cluster of host computers. At block 510, a scale-out operation is executed on the cluster of host computers using an available resource instance for the cloud-based computing environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for autoscaling clusters of host computers in a cloud-based computing environment, the method comprising:
    generating a scale-out recommendation for a cluster of host computers in the cloud-based computing environment;
    checking the cloud-based computing environment for any available reserved resource instances in response to the scale-out recommendation;
    when a number of available reserved resource instance for the cloud-based computing environment is below a predefined value, searching the cloud-based computing environment for any target clusters of host computers to scale in based on at least one resource utilization using an aggressive scale-in resource utilization threshold that is greater than a corresponding standard scale-in resource utilization threshold;
    when at least one target cluster of host computers is found, executing a scale-in operation on a candidate cluster of host computers selected from the at least one target cluster of host computers to remove an existing resource instance from the candidate cluster of host computers; and
    executing a scale-out operation on the cluster of host computers using an available resource instance for the cloud-based computing environment, wherein executing the scale-out operation on the cluster of host computers includes executing the scale-out operation on the cluster of host computers using an on-demand resource instance from a cloud provider.

2. The computer-implemented method of claim 1, wherein the available resource instance used for the scale-out operation on the cluster of host computers is the on-demand resource instance and wherein the existing resource instance removed from the candidate cluster of host computers is added to a buffer of at least one reserved resource instance for the cloud-based computing environment.

3. The computer-implemented method of claim 1, wherein the existing resource instance removed from the candidate cluster of host computers is reused as the available resource instance for the scale-out operation on the cluster of host computers only when the candidate cluster of host computers and the cluster of host computers are in a same software-defined data center (SDDC) in the cloud-based computing environment.

4. The computer-implemented method of claim 1, wherein searching the cloud-based computing environment for any target clusters of host computers to scale in includes searching the cloud-based computing environment for any target clusters of host computers to scale in using aggressive scale-in resource utilization thresholds for storage, CPU and memory, wherein each target cluster of host computers has resource utilization values that are all below the aggressive scale-in resource utilization thresholds for storage, CPU and memory.

5. The computer-implemented method of claim 1, further comprising selecting the candidate cluster of host computers based on whether the candidate cluster of host computers belong to a same software-defined data center (SDDC) to which the cluster of host computers belongs.

6. The computer-implemented method of claim 1, further comprising selecting the candidate cluster of host computers based on whether the candidate cluster of host computers includes the on-demand resource instance so that the on-demand resource instance can be removed from the candidate cluster of host computers.

7. The computer-implemented method of claim 1, further comprising selecting the candidate cluster of host computers based on an amount of data storage being handled by a host computer in the candidate cluster of host computers.

8. The computer-implemented method of claim 1, wherein the available resource instance for the cloud-based computing environment is a host computer.

9. A non-transitory computer-readable storage medium containing program instructions for autoscaling clusters of host computers in a cloud-based computing environment, wherein execution of the program instructions by one or more processors causes the one or more processors to perform steps comprising:
    generating a scale-out recommendation for a cluster of host computers in the cloud-based computing environment;
    checking the cloud-based computing environment for any available reserved resource instances in response to the scale-out recommendation;
    when a number of available reserved resource instance for the cloud-based computing environment is below a predefined value, searching the cloud-based computing environment for any target clusters of host computers to scale in based on at least one resource utilization using an aggressive scale-in resource utilization threshold that is greater than a corresponding standard scale-in resource utilization threshold;

when at least one target cluster of host computer is found, executing a scale-in operation on a candidate cluster of host computers selected from the at least one target cluster of host computers to remove an existing resource instance from the candidate cluster of host computers; and executing a scale-out operation on the cluster of host computers using an available resource instance for the cloud-based computing environment, wherein executing the scale-out operation on the cluster of host computers includes executing the scale-out operation on the cluster of host computers using an on-demand resource instance from a cloud provider.

10. The non-transitory computer-readable storage medium of claim 9, wherein the available resource instance used for the scale-out operation on the cluster of host computers is the on-demand resource instance and wherein the existing resource instance removed from the candidate cluster of host computers is added to a buffer of at least one reserved resource instance for the cloud-based computing environment.

11. The non-transitory computer-readable storage medium of claim 9, wherein the existing resource instance removed from the candidate cluster of host computers is reused as the available resource instance for the scale-out operation on the cluster of host computers only when the candidate cluster of host computers and the cluster of host computers are in a same software-defined data center (SDDC) in the cloud-based computing environment.

12. The non-transitory computer-readable storage medium of claim 9, wherein searching the cloud-based computing environment for any target clusters of host computers to scale in includes searching the cloud-based computing environment for any target clusters of host computers to scale in using aggressive scale-in resource utilization thresholds for storage, CPU and memory, wherein each target cluster of host computers has resource utilization values that are all below the aggressive scale-in resource utilization thresholds for storage, CPU and memory.

13. The non-transitory computer-readable storage medium of claim 9, wherein the steps further comprise selecting the candidate cluster of host computers based on whether the candidate cluster of host computers belong to a same software-defined data center (SDDC) to which the cluster of host computers belongs.

14. The non-transitory computer-readable storage medium of claim 9, wherein the steps further comprise selecting the candidate cluster of host computers based on whether the candidate cluster of host computers includes the on-demand resource instance so that the on-demand resource instance can be removed from the candidate cluster of host computers.

15. The non-transitory computer-readable storage medium of claim 9, wherein the steps further comprise selecting the candidate cluster of host computers based on an amount of data storage being handled by a host computer in the candidate cluster of host computers.

16. The non-transitory computer-readable storage medium of claim 9, wherein the available resource instance for the cloud-based computing environment is a host computer.

17. A system comprising:
memory; and
one or more processors configured to:
generate a scale-out recommendation for a cluster of host computers in a cloud-based computing environment;
check the cloud-based computing environment for any available reserved resource instances in response to the scale-out recommendation;
when a number of available reserved resource instance for the cloud-based computing environment is below a predefined value, search the cloud-based computing environment for any target clusters of host computers to scale in based on at least one resource utilization using an aggressive scale-in resource utilization threshold that is greater than a corresponding standard scale-in resource utilization threshold;
when at least one target cluster of host computer is found, execute a scale-in operation on a candidate cluster of host computers selected from the at least one target cluster of host computers to remove an existing resource instance from the candidate cluster of host computers; and
execute a scale-out operation on the cluster of host computers using an available resource instance for the cloud-based computing environment, wherein the one or more processors is configured to execute the scale-out operation on the cluster of host computers using an on-demand resource instance from a cloud provider.

18. The system of claim 17, wherein the available resource instance used for the scale-out operation on the cluster of host computers is the on-demand resource instance and wherein the existing resource instance removed from the candidate cluster of host computers is added to a buffer of at least one reserved resource instance for the cloud-based computing environment.

19. The system of claim 17, wherein the one or more processors is configured to reuse the existing resource instance removed from the candidate cluster of host computers as the available resource instance for the scale-out operation on the cluster of host computers only when the candidate cluster of host computers and the cluster of host computers are in a same software-defined data center (SDDC) in the cloud-based computing environment.

20. The system of claim 17, wherein the one or more processors is configured to select the candidate cluster of host computers based on whether the candidate cluster of host computers belong to a same software-defined data center (SDDC) to which the cluster of host computers belongs.

* * * * *